Sept. 27, 1955  W. A. HEINRICH  2,718,909
JIG SAWS
Filed Aug. 27, 1951  2 Sheets-Sheet 1
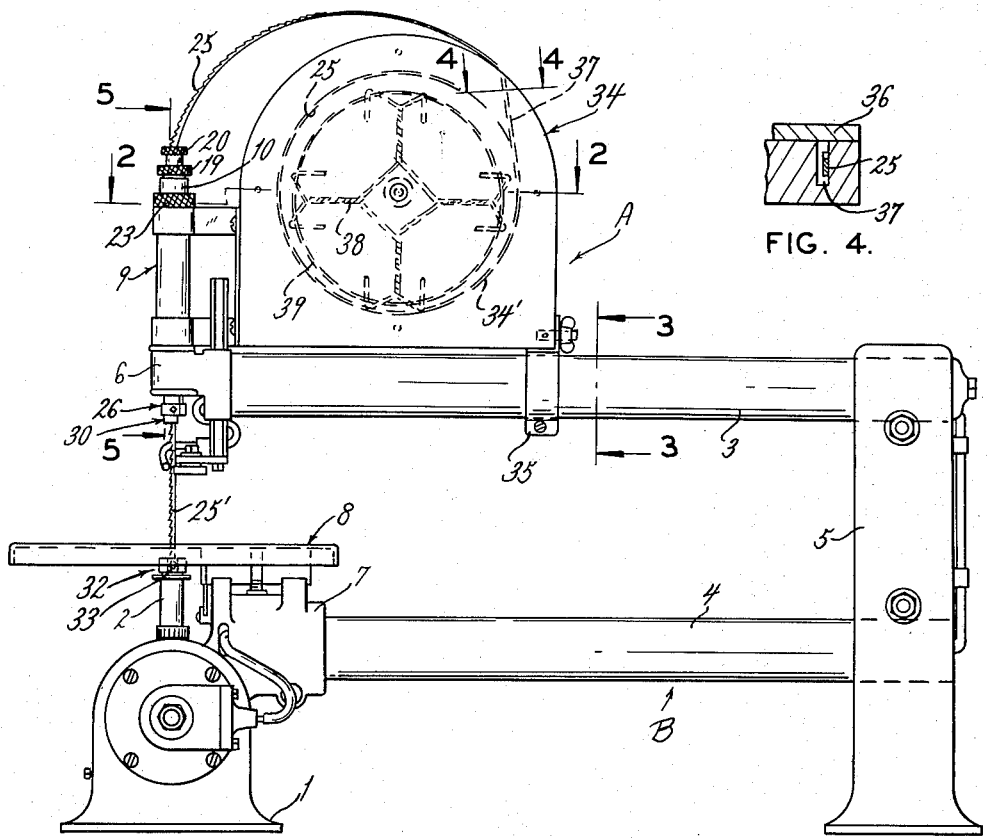
FIG. 4.
FIG. 1.
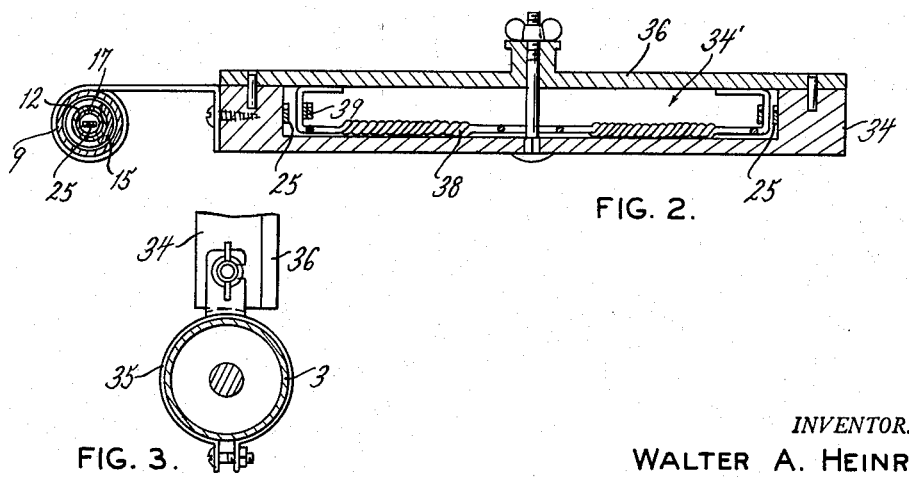
FIG. 2.
FIG. 3.
INVENTOR.
WALTER A. HEINRICH
BY
*E. m. Harrington,*
ATTORNEY Sept. 27, 1955  W. A. HEINRICH  2,718,909
JIG SAWS
Filed Aug. 27, 1951  2 Sheets-Sheet 2
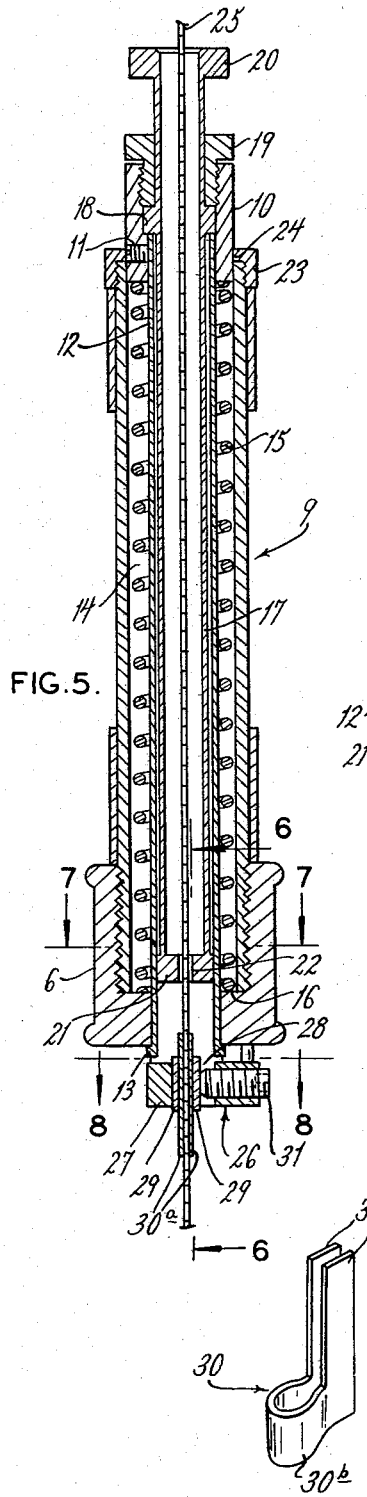
FIG. 5.
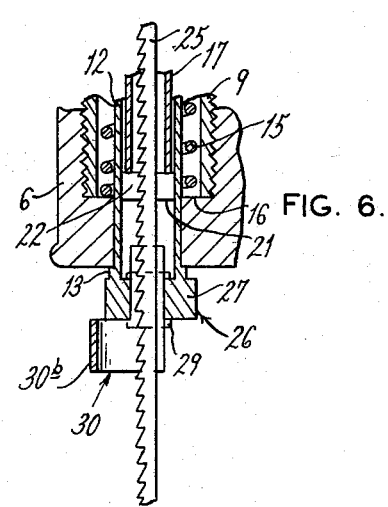
FIG. 6.
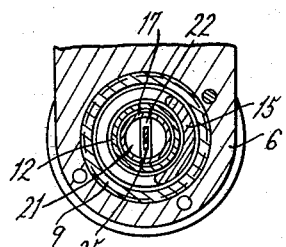
FIG. 7.
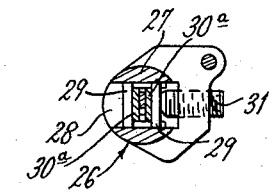
FIG. 8.
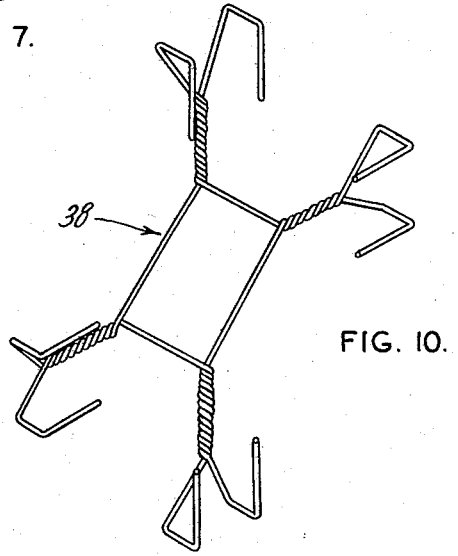
FIG. 9.
FIG. 10.
INVENTOR.
WALTER A. HEINRICH
BY
ATTORNEY

United States Patent Office 2,718,909
Patented Sept. 27, 1955

2,718,909

JIG SAWS

Walter A. Heinrich, Richmond Heights, Mo.

Application August 27, 1951, Serial No. 243,804

7 Claims. (Cl. 143—70)

This invention relates generally to jig saws and has for its predominant object the provision of a jig saw which is provided with a blade of very considerable length that may be subjected to a feeding action to provide a new length of blade to replace a length of blade previously in service which has become worn in use and which is cut from the full length of the blade. Prior to this invention jig saws were provided with individual blades of the required length, usually about six inches long, and when the blade of a jig saw became worn in use it was removed and replaced by a similar but unworn individual blade. While this arrangement functioned with reasonable efficiency it was deficient in that the individual blades were relatively expensive and it was necessary that the users of the jig saws remember to maintain a stock of blades on hand so that a worn blade might be replaced when necessary. In accordance with the present invention a blade of considerable length is employed with a jig saw and when the effective portion of blade becomes worn in use it is cut from the blade and a new effective blade portion is fed into position for use.

Fig. 1 is a side elevation of a jig saw arranged in accordance with this invention.

Fig. 2 is a horizontal section taken on line 2—2 of Fig. 1.

Fig. 3 is an enlarged vertical section taken on line 3—3 of Fig. 1.

Fig. 4 is a section taken on line 4—4 of Fig. 1.

Fig. 5 is an enlarged, vertical section taken on line 5—5 of Fig. 1.

Fig. 6 is a fragmentary vertical section taken on line 6—6 of Fig. 5.

Fig. 7 is a horizontal section taken on line 7—7 of Fig. 5.

Fig. 8 is a horizontal section taken on line 8—8 of Fig. 5.

Fig. 9 is a perspective view of clamp which forms a part of the invention.

Fig. 10 is a perspective view of a holder for extra blades which forms a part of the invention.

In the drawings wherein is shown for purposes of illustration, merely, one embodiment of the invention, A designates the improved jig saw generally in Fig. 1. The jig saw A includes a main housing 1 which supports for vertical reciprocatory movement a lower plunger 2, said lower plunger being projected upwardly out of said main housing, as is shown to good advantage in Fig. 1. The main housing 1 houses mechanism for reciprocating the lower plunger in a vertical direction, but as such mechanism is well known it need not be described herein. The jig saw A is provided with a supporting frame B made up of an upper frame tube 3, a lower frame tube 4, and a rear column 5, said upper frame tube 3 being connected at its forward end to an upper head 6, said lower frame tube 4 being connected at its forward end to a part 7 of the main housing 1, and the upper and lower frame tubes 3 and 4 being connected at the rear ends thereof to the rear column 5. The jig saw A is provided also with a table 8 which is suitably supported by the part 7 of the main housing 1.

The upper head 6 of the jig saw supports a tubular casing 9, said tubular casing being externally screwthreaded at its lower end portion and said lower end portion being screwthreadedly seated in a screwthreaded opening formed in said upper head, as is shown to good advantage in Fig. 5. At the upper end of the tubular casing 9 a sleeve 10 is supported partly within and partly outside of said tubular casing. The sleeve 10 is secured by means of a set screw 11 to a tube 12, the upper end portion of said tube 12 being extended into the sleeve and the set screw being disposed in a screwthreaded opening formed in the wall of the sleeve and the inner end of the set screw engaging the tube 12. The tube 12 extends downwardly through the tubular casing 9, as is shown to good advantage in Fig. 5, and at its lower end said tube is provided with an enlarged portion 13, the top face of which serves as an abutment that contacts with the lower face of the upper head 6 so as to limit upward movement of the tube 12. The wall of the tube 12 is spaced from the wall of the tubular casing 9 to provide an annular space 14 and disposed in this space is a coil spring 15 whose upper end contacts with the lower face of the sleeve 10 and whose lower end contacts with an annular shoulder 16 formed within the upper head 6 whereby said coil spring tends to move the tube 12 upwardly.

Disposed within the tube 12 is an inner tube 17 which serves as the upper plunger of the jig saw and is provided with an annular portion 18 of increased diameter. The lower face of the portion 18 contacts with the top edge of the tube 12, as is shown in Fig. 5, and a binding screw 19 is screwed into the upper screwthreaded end portion of the sleeve 10 and engages the upper face of said portion 18 of the inner tube 17. Thus, the tube 12 and the inner tube 17 are securely locked together for unitary movement. The inner tube 17 is provided at its upper end with an annular flange 20, and at the lower end of said inner tube a bottom wall 21 is provided through which a slot 22 is formed. Also, the tubular casing 9 is externally screwthreaded at its upper end and this screwthreaded upper end portion receives a cap 23 that is provided with an opening 24 through which the sleeve 10 extends.

The blade 25 of the jig saw of the present invention is of very considerable length and it passes downwardly through the inner tube 17 and through the slot 22 formed through the bottom wall 21 thereof. Located at the lower end of the tube 12 is a chuck 26 which comprises a body portion 27 having an opening 28 formed therethrough (Fig. 8), said opening having a pair of jaws 29 suitably disposed therein. Arranged between the jaws 29 are the portions 30a of a clip 30, said clip being formed from material possessing resiliency and having a lower yoke portion 30b which resiliently joins said portions 30a. The blade 25 extends through the chuck between the portions 30a of the clip 30 and between the jaws 29, as is shown to good advantage in Fig. 5, and the chuck 26 includes a set screw 31 which is supported for screwthreaded adjustment in a screwthreaded opening formed in the body portion 27 of the chuck 26, said set screw being adapted on proper adjustment to force the jaws 29 toward each other so as to grip the portions 30a of the clip 30 therebetween and clamp a portion of the blade 25 between said portions 30a of said clip. Likewise, the lower plunger is provided at its upper end with a chuck 32 which is constructed in accordance with the chuck 26 of the upper plunger of the jig saw with the exception that no clip is employed with the chuck 32. In other words, the lower chuck includes a pair of jaws (not shown) which are forced toward each other by a set screw 33 to clamp an end portion of the blade 25 therebetween.

The blade of the jig saw of the present invention as has been hereinbefore stated, is of very considerable length, but the portion 25' of said blade located between the upper chuck 26 and the lower chuck 32 is the only part thereof which serves a cutting function during operation of the jig saw, this blade portion being reciprocated vertically during operation of the jig saw to perform its cutting function. Naturally, the blade portion 25' becomes worn from use and when this happens it is necessary, merely, to unscrew the set screw 33 of the chuck 32 of the lower plunger 2 and detach the lower end portion of the blade from said chuck 32, and unscrew the set screw 31 of the chuck 26 of the upper plunger of the jig saw. The worn portion of the blade may then be pulled out and cut from the blade and the lower portion of the blade moved downwardly until its lower end portion is in position to be clamped by the lower chuck 32, the set screw 31 of the upper chuck 32 then being set to clamp a portion of the blade between the portions 30a of the clip 30 and clamp said portions 30a of said clip 30 between the jaws 29, whereupon the jig saw is again ready for use.

The excess length of the blade 25 of the jig saw A may be taken care of in various ways. For instance, such excess blade length may hang loose, or it may be mounted on a reel supported by a part of the jig saw or by a portion of the room in which the jig saw is located. However, an arrangement is illustrated in the drawings according to which a housing 34 is associated with the jig saw which receives much of the excess length of the blade. This housing 34 is provided with a clamp 35 which engages the upper frame tube 3 and a pair of clamps which engage the tubular casing 9, as is shown in Fig. 1. The housing 34 is provided with a circular cavity 34' formed therein which is closed by a removable wall 36 of said housing, and a passageway 37 leads from an outer surface of an upper portion of the housing into the cavity 34'. When the housing 34 is employed with a jig saw arranged in accordance with the present invention, the excess length of the blade 25 will extend through the passageway 37 and such excess blade length will be coiled within the cavity 34' of the housing 34. Also, if desired a suitable reel 38 may be disposed within the cavity 34' of the housing 34 on which may be wound extra blades 39 of different sizes.

I claim:

1. A cutting apparatus comprising a member supported for reciprocatory movement, means for attaching a blade portion to said member, a second member supported for reciprocatory movement, means for attaching a blade portion to said second member, and a blade of such considerable length, as to provide said blade with an expendable reserve operative blade supply, said blade being shiftable to locate different portions of said blade in position between said attaching means of said members and clamped thereby to said members, portions of said blade being removed from the blade when said portions become worn from use and said reserve blade supply supplying substitute portions for the blade portions which are so removed.

2. A cutting apparatus comprising a lower plunger supported for reciprocatory movement, means for attaching a blade portion to said lower plunger, an upper plunger supported for reciprocatory movement, means for attaching a blade portion to said upper plunger, and a blade of such considerable length, as to provide said blade with an expendable reserve operative blade supply, said blade being shiftable to locate different portions of said blade in position between said attaching means of said plungers and clamped thereby to said lower and upper plungers, portions of said blade being removed from the blade when said portions become worn from use and said reserve blade supply supplying substitute portions for the blade portions which are so removed.

3. A cutting apparatus comprising a lower plunger supported for reciprocatory movement, means comprising chucks for attaching a blade portion to said lower plunger, an upper plunger supported for reciprocatory movement, means comprising chucks for attaching a blade portion to said upper plunger, and a blade of such considerable length, as to provide said blade with an expendable reserve operative blade supply, said blade being shiftable to locate different portions of said blade in position between said attaching means of said plungers and clamped thereby to said lower and upper plungers, portions of said blade being removed from the blade when said portions become worn from use and said reserve blade supply supplying substitute portions for the blade portions which are so removed.

4. A cutting apparatus comprising a lower plunger supported for reciprocatory movement, means for attaching a blade portion to said lower plunger, an upper plunger supported for reciprocatory movement, means for attaching a blade portion to said upper plunger, a blade of such considerable length, as to provide said blade with an expendable reserve operative blade supply, said blade being shiftable to locate different portions of said blade in position between said attaching means of said plungers and clamped thereby to said lower and upper plungers, and means for supporting the excess length of said blade, portions of said blade being removed from the blade when said portions become worn from use and said reserve blade supply supplying substitute portions for the blade portions which are so removed.

5. A cutting apparatus comprising a lower plunger supported for reciprocatory movement, means for attaching a blade portion to said lower plunger, an upper plunger supported for reciprocatory movement, means for attaching a blade portion to said upper plunger, and a blade of such considerable length, as to provide said blade with an expendable reserve operative blade supply, said blade being shiftable to locate different portions of said blade in position between said attaching means of said plungers and clamped thereby to said lower and upper plungers, said upper plungers being hollow and said blade being extended therethrough, portions of said blade being removed from the blade when said portions become worn from use and said reserve blade supply supplying substitute portions for the blade portions which are so removed.

6. A cutting apparatus comprising a lower plunger supported for reciprocatory movement, means for attaching a blade portion to said lower plunger, an upper plunger supported for reciprocatory movement, means for attaching a blade portion to said upper plunger, a blade of such considerable length, as to provide said blade with an expendable reserve operative blade supply, said blade being shiftable to locate different portions of said blade in position between said attaching means of said plungers and clamped thereby to said lower and upper plungers, and means for supporting the excess length of said blade, portions of said blade being removed from the blade when said portions become worn from use and said reserve blade supply supplying substitute portions for the blade portions which are so removed.

7. A cutting apparatus comprising a lower plunger supported for reciprocatory movement, means for attaching a blade portion to said lower plunger, an upper plunger supported for reciprocatory movement, means for attaching a blade portion to said upper plunger, a blade of such considerable length, as to provide said blade with an expendable reserve operative blade supply, said blade being shiftable to locate different portions of said blade in position between said attaching means of said plungers and clamped thereby to said lower and upper plungers, and means comprising a reel supported by said cutting apparatus for supporting the excess length of said blade, portions of said blade being removed from the blade when said portions become worn from use and said reserve blade supply supplying substitute portions for the blade portions which are so removed.

(References on following page)

References Cited in the file of this patent

UNITED STATES PATENTS

| | | |
|---|---|---|
| 139,644 | Young | June 3, 1873 |
| 183,029 | Shipman | Oct. 10, 1876 |
| 196,796 | Glover | Nov. 6, 1877 |
| 1,454,735 | Hamlin | May 8, 1923 |
| 1,877,705 | Tautz | Sept. 13, 1932 |
| 2,165,002 | Ocenasek | July 4, 1939 |
| 2,327,239 | Bartlett | Aug. 17, 1943 |
| 2,347,918 | Lethenstrom | May 2, 1944 |

FOREIGN PATENTS

| | | |
|---|---|---|
| 587,087 | France | Apr. 10, 1925 |
| 411,927 | Great Britain | June 21, 1934 |